United States Patent Office 2,704,296

Patented Mar. 15, 1955

2,704,296

TREATMENT OF MALEIC ACID LIQUORS WITH CHLORINE

Elmer H. Dobratz, Clayton, Mo., assignor to Monsanto Chemical Company, St. Louis, Mo., a corporation of Delaware No Drawing. Application December 29, 1951, Serial No. 264,240

2 Claims. (Cl. 260—537)

This invention relates to a new method for the treatment of impure maleic acid solutions, and more particularly to the treatment of crude aqueous maleic acid liquors to improve the quality of these maleic acid liquors and render them more suitable for further use in chemical processes requiring aqueous solutions of maleic acid.

According to this invention, impure maleic acid liquors may be substantially improved for use in chemical processes utilizing aqueous solutions of maleic acid by passing free chlorine into the crude aqueous maleic acid liquors. As a result of the treatment of the maleic acid liquors in accordance with this invention, the deleterious effect of many of the various impurities in the crude maleic acid liquors in subsequent chemical processes utilizing maleic acid solutions are substantially reduced or eliminated.

Maleic anhydride may be commercially produced by the catalytic oxidation of various hydrocarbons such as butadiene, benzene or naphthalene, and in such operations aqueous maleic acid solutions are obtained which are herein referred to as "maleic acid liquors." For example, in the manufacture of maleic anhydride by the catalytic oxidation of benzene, the gases from the catalytic oxidation converters are scrubbed with water to form aqueous maleic acid liquors. In the manufacture of phthalic anhydride, such as by the catalytic oxidation of naphthalene, a certain amount of maleic anhydride is formed as a co-product. The phthalic anhydride is condensed from the gases leaving the catalytic oxidation converters and thereafter the tail gases containing maleic anhydride are scrubbed with water to form aqueous maleic acid liquors. These crude maleic acid scrub liquors are thereafter dehydrated to obtain crude maleic anhydride which is subjected to various purification steps, including fractionation, to obtain the purified maleic anhydride. During the various steps in these dehydration operations, other maleic acid liquors are formed as dehydration distillation condensates containing maleic acid in various concentrations in addition to varying amounts and kinds of impurities. When maleic anhydride is made by dehydrating these impure maleic acid liquors, the impurities present in the crude maleic acid liquors often appear in the maleic anhydride, necessitating additional purification steps on the maleic anhydride to remove the impurities themselves or other deleterious effects of the impurities. Moreover, when these impure maleic acid liquors are used directly in chemical processes requiring aqueous maleic acid solutions, the impurities carried into the processes by the impure maleic acid liquors often times adversely affect the course of the subsequent chemical reactions or appear as impurities even in the final product of the subsequent chemical reactions. For example, fumaric acid is generally commercially produced by subjecting an aqueous solution of maleic acid to an isomerization operation using various inorganic isomerization catalysts such as iodine, bromine, hydrochloric acid, hydrobromic acid, sulfuric acid, potassium thiocyanate, sodium bromide, etc. The maleic acid liquors which are available from maleic anhydride processes as described above are apparently ideal sources of maleic acid solutions for use in processes to prepare fumaric acid. However, the nature and kind of impurities and contaminants which are generally present in these crude maleic acid liquors are such that they frequently adversely affect the catalytic isomerization process and usually contaminate the final fumaric acid product. For example, a commercial fumaric acid should be very nearly white, however, fumaric acid which is prepared by directly subjecting the crude maleic acid liquors to an isomerization reaction, is frequently dirty gray to tan in color, making it necessary to subject the fumaric acid to elaborate and expensive purification steps in order to bring it up to a substantially white color required by the trade.

Various methods have been proposed for inactivating or removing the contaminants and impurities in these crude maleic acid liquors in order, for example, to improve their quality for use in fumaric acid processes in order that a high quality fumaric acid could be obtained directly from these liquors. However, most of these processes have proved to be only partially effective or the chemicals involved for treatment so expensive as to render them impractical.

The practice of this invention is very simple and the quantity of chlorine required is very small so that the costs involved in practice are extremely low. Therefore, this invention provides a very practical and economical method for treating crude maleic acid liquors to substantially reduce or eliminate the effect of the impurities on later products or processes.

The quantity of chlorine required in the practice of this invention is usually of the order of only 1 to 3%, and even in extreme cases less than 5%, based on the weight of the maleic acid present in the crude liquor.

In general, I have found that merely passing gaseous chlorine into the crude maleic acid liquors until the liquors become pale lemon yellow in color renders these liquors highly improved for use in subsequent chemical processes, however, I have found that is is preferable to maintain the crude liquors at temperatures between about 70° C. and the boiling point of these liquors at atmospheric pressure while a quantity of chlorine amounting to about 1 to 3%, and usually less than about 5% of the weight of the maleic acid present is passed into the liquors. This treatment generally removes or inactivates the impurities present so that their effect on subsequent chemical processes and products are substantially reduced or eliminated. Moreover, when these liquors are subjected to catalytic isomerization using the conventional isomerization catalysts to produce fumaric acid, the actual presence of the chlorine remaining in the treated maleic liquor does not adversely effect the isomerization reaction, and frequently further improves the quality of the fumaric acid product.

It is not necessary to always practice this invention as a separate and independent step, but frequently it can be economically and conveniently combined with another process step, for example, in the manufacture of fumaric acid it is usually desirable to concentrate the relatively dilute maleic acid liquors by distillation before subjecting these liquors to an isomerization reaction. In which case, the chlorine can be passed into the maleic acid liquor while the liquor is being concentrated by distillation, as the boiling temperature of the maleic acid liquors during concentration at atmospheric pressure are among those most favorable for the practice of this invention.

While the treatment of maleic acid liquors with chlorine in the manner as hereindescribed substantially reduces or eliminates the effects of the impurities contained in the crude liquors on products made from, or later processes utilizing, aqueous maleic acid solutions, these maleic acid liquors which have been treated with chlorine can be still further improved by contacting such treated liquors with activated charcoal. Crude maleic acid liquors which have been both treated with chlorine and thereafter also treated with activated charcoal provide excellent maleic acid solutions for chemical processes requiring or utilizing such solutions.

The following examples will illustrate the practice of this invention, however, it is not intended that the scope of this invention be limited solely to the conditions and proportions set out in these examples.

*Example I*

In this example, the isomerization of the maleic acid was carried out with hydrochloric acid as the catalyst, but in the absence of free chlorine, and will serve to illustrate the improved results obtained by the practice of my invention as illustrated in subsequent examples. 1300 grams of a crude maleic acid liquor representing a portion of the aqueous condensate from a dehydration step in a commercial process for the manufacture of maleic anhydride by the catalytic oxidation of benzene was used as a starting material. This aqueous condensate contained about 339 grams of maleic acid. This aqueous condensate was concentrated by distillation at atmospheric pressure until the concentration of maleic acid had reached approximately 63%. Thereafter this concentrated maleic acid solution was heated to its reflux temperature at atmospheric pressure, and while the reflux conditions were maintained, 108 grams of concentrated hydrochloric acid (36% hydrogen chloride) was slowly added to the refluxing maleic acid solution over a period of ten minutes, during which time fumaric acid crystals began to separate from the reaction mixture. Thereafter the isomerization reaction mixture was continued under refluxing conditions for about two hours at which time the reaction mixture was cooled to room temperature and the separated fumaric acid crystals were recovered by filtration, the separated crystals being washed with dilute hydrochloric acid and water and subsequently dried. The fumaric acid thus obtained was a brownish tan in color and otherwise of low quality.

*Example II*

The above example was repeated, however, the aqueous condensate containing the maleic acid was twice treated with activated charcoal prior to concentration. The resulting fumaric acid crystals were only slightly improved in color over the color of the fumaric acid crystals of Example I and also a very low grade product.

*Example III*

Upon repeating the process of Example I, excepting that about 15 grams of chlorine is slowly passed into the crude maleic acid liquor maintained at about 70° C. prior to the concentration step, there is produced fumaric acid having a light yellow color but of good commercial quality in contrast to the low grade products of Examples I and II.

*Example IV*

Chlorine was passed into 1289 grams of aqueous condensate, containing 385 grams of maleic acid, at 75 to 80° C. for 10 minutes. The batch was permitted to cool to 30° C. and 3.5 grams of activated charcoal was added. It was stirred 15 minutes and another 3.5 grams of activated charcoal was added. After stirring 15 minutes it was filtered on a filter aid pre-coated funnel. The filtrate was concentrated by distillation at atmospheric pressure until the concentration of maleic acid in water was approximately 63%. While maintaining the concentrated maleic acid solution under gentle reflux conditions, 107 grams of concentrated hydrochloric acid was added over a period of ten minutes. The batch was maintained at a gentle reflux for two hours after the addition of the hydrochloric acid was complete. It was then cooled to room temperature and the precipitated fumaric acid was recovered by filtration. It was washed with dilute hydrochloric acid followed by water and was dried. The fumaric acid was substantially white with only a very faint yellow cast. It weighed 343 grams.

*Example V*

1245 grams of a crude maleic acid solution obtained as the aqueous condensate from the dehydration of crude maleic acid liquors from the manufacture of maleic anhydride by the controlled catalytic oxidation of benzene, was first treated with chlorine by passing chlorine into the maleic acid solution until the color of the liquid became a pale lemon yellow. This liquor was then contacted with activated charcoal, the charcoal being removed by filtration. Thereafter this maleic acid solution was then concentrated by distillation at atmospheric pressure until the concentration of the maleic acid was approximately 63%, and during the entire concentration operation, a slow stream of chlorine was kept passing into the maleic acid solution. Thereafter the concentrated liquor was maintained under gentle reflux conditions and a flow of chlorine into the refluxing liquor continued while 123 grams of concentrated hydrochloric acid (36% HCl) was added over a period of about ten minutes. Thereafter the isomerization of the maleic acid was completed by heating the reaction mixture under reflux conditions for an additional two hours during which time the flow of chlorine was continued into the reaction mixture. The crystalline fumaric acid was thereafter recovered from the cooled reaction mixture by filtration, washed with dilute hydrochloric acid and cold water and dried. The fumaric acid so obtained was of excellent quality, snow white and weighed 318 grams, representing a yield of 90.0%.

The process of isomerizing maleic acid in the presence of free chlorine in addition to an isomerization catalyst is described and claimed in my co-pending application, Serial Number 264,239, filed December 29, 1951.

I claim:

1. In a process for the treatment of crude maleic acid liquors, the steps comprising passing free chlorine into the said maleic acid liquors while the said maleic acid liquors are maintained at temperatures within the range of about 70° C. and the refluxing temperatures of the maleic acid liquors at atmospheric pressure, and thereafter contacting the maleic acid liquors with activated charcoal and separating the activated charcoal from the maleic acid liquors.

2. In a process for the treatment of relatively dilute crude maleic acid liquors, the steps comprising concentrating the said maleic acid liquors by distillation at atmospheric pressure while passing free chlorine into the boiling maleic acid liquors, and thereafter contacting the concentrated maleic acid liquors with activated charcoal and then separating the concentrated maleic acid liquor from the activated charcoal.

References Cited in the file of this patent

UNITED STATES PATENTS

| | | |
|---|---|---|
| 2,170,972 | Martin | Aug. 29, 1939 |
| 2,208,519 | Spence et al. | July 16, 1940 |
| 2,349,514 | Moyer | May 23, 1944 |
| 2,358,775 | Finch et al. | Sept. 26, 1944 |
| 2,365,631 | Faith | Dec. 19, 1944 |
| 2,393,352 | Winstrom | Jan. 22, 1946 |
| 2,494,049 | Levin | Jan. 10, 1950 |

FOREIGN PATENTS

Michael et al., Beilstein (Handbuch, 4th ed.), vol. II, p. 619 (1920).

Wislicenus, Beilstein (Handbuch, 4th ed.), vol. II, p. 738 (1920).

Anschutz, Beilstein (Handbuch, 4th ed.), vol. II, pp. 741–2 (1920).

Kuhn et al., Ber. Deut. Chem., vol. 61, page 501 (1928).

Wachholtz, Chem. Abstracts, vol. 22, page 908 (1928).

Derbyshire et al., Chem. Abstracts, vol. 44, page 1033 (1950).